(12) United States Patent
He

(10) Patent No.: US 11,277,466 B2
(45) Date of Patent: Mar. 15, 2022

(54) FILE TRANSFERRING METHOD AND APPARATUS, INTERACTIVE METHOD AND APPARATUS FOR IMPLEMENTING UPLOADING IN CLOUD STORAGE APPLICATION, MACHINE DEVICE, AND COMPUTER-READABLE STORAGE MEDIUM

(71) Applicant: TENCENT TECHNOLOGY (SHENZHEN) COMPANY LIMITED, Shenzhen (CN)

(72) Inventor: Junzhi He, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 12 days.

(21) Appl. No.: 16/366,961

(22) Filed: Mar. 27, 2019

(65) Prior Publication Data

US 2019/0222632 A1   Jul. 18, 2019

Related U.S. Application Data

(63) Continuation of application No. PCT/CN2018/082771, filed on Apr. 12, 2018.

(30) Foreign Application Priority Data

Apr. 26, 2017 (CN) .......................... 201710284092.4

(51) Int. Cl.
| | | |
|---|---|---|
| *H04L 29/08* | (2006.01) | |
| *H04L 67/06* | (2022.01) | |
| *G06F 3/0486* | (2013.01) | |
| *G06F 3/04883* | (2022.01) | |
| *G06F 9/451* | (2018.01) | |
| *G06F 3/0481* | (2022.01) | |
| *G06F 3/0488* | (2022.01) | |
| *G06F 16/00* | (2019.01) | |
| *G06F 16/16* | (2019.01) | |
| *H04L 41/22* | (2022.01) | |

(Continued)

(52) U.S. Cl.
CPC ............ *H04L 67/06* (2013.01); *G06F 3/0481* (2013.01); *G06F 3/0486* (2013.01);
(Continued)

(58) Field of Classification Search
CPC ..... H04L 67/06; H04L 67/1097; H04L 67/22; H04L 67/1095; G06F 3/04883;
(Continued)

(56) References Cited

U.S. PATENT DOCUMENTS

| | | | | |
|---|---|---|---|---|
| 2005/0114784 A1* | 5/2005 | Spring | .................... | H04L 67/28 715/762 |
| 2010/0122194 A1* | 5/2010 | Rogers | .................. | G06F 3/0482 715/769 |

(Continued)

FOREIGN PATENT DOCUMENTS

| | | |
|---|---|---|
| CN | 103092487 A | 5/2013 |
| CN | 103840859 A | 6/2014 |

(Continued)

OTHER PUBLICATIONS

Gibb, "How to Pin Apps With Custom Parameters to the Taskbar in Windows 7", Oct. 11, 2011, How-To Geek, p. 1-6, 7 pages. (Year: 2011).*

(Continued)

*Primary Examiner* — Arvin Eskandarnia
(74) *Attorney, Agent, or Firm* — Anova Law Group, PLLC

(57) ABSTRACT

A file transferring method is disclosed. The method includes activating a transferring area on a displayed user interface in response to triggering of file transferring; tracking drag trajectory according to a triggered dragging instruction on the user interface on which the transferring area is activated, and detecting, when the dragging is released, that the transferring area and a file icon overlap; and transferring a (Continued)

corresponding file in response to the file icon overlapping with the transferring area.

16 Claims, 13 Drawing Sheets

(51) Int. Cl.
*G06F 3/04817* (2022.01)
*H04L 67/1097* (2022.01)
*H04L 67/50* (2022.01)
*H04L 67/1095* (2022.01)

(52) U.S. Cl.
CPC ........ *G06F 3/0488* (2013.01); *G06F 3/04817* (2013.01); *G06F 3/04883* (2013.01); *G06F 9/451* (2018.02); *G06F 16/00* (2019.01); *G06F 16/168* (2019.01); *H04L 41/22* (2013.01); *H04L 67/1097* (2013.01); *H04L 67/22* (2013.01); *H04L 67/1095* (2013.01)

(58) Field of Classification Search
CPC ...... G06F 9/451; G06F 3/0481; G06F 3/0488; G06F 16/00; G06F 3/04817; G06F 3/0486; G06F 16/168
See application file for complete search history.

(56) References Cited

U.S. PATENT DOCUMENTS

| | | | |
|---|---|---|---|
| 2010/0246390 A1* | 9/2010 | Wu | H04N 19/61 370/230 |
| 2013/0204945 A1* | 8/2013 | Li | H04L 41/22 709/205 |
| 2014/0033066 A1* | 1/2014 | Li | G06F 3/0486 715/748 |
| 2015/0278266 A1* | 10/2015 | Tang | G06F 16/248 707/711 |
| 2015/0339030 A1* | 11/2015 | Yuan | G06F 9/451 715/739 |
| 2015/0363062 A1* | 12/2015 | Gunn | G06F 16/168 715/784 |

FOREIGN PATENT DOCUMENTS

| | | | | |
|---|---|---|---|---|
| CN | 104216607 A | | 12/2014 | |
| JP | 2013-125498 A | * | 5/2013 | ............. G06F 12/00 |
| WO | 2006124193 A2 | | 11/2006 | |

OTHER PUBLICATIONS

Elliott, "How to get started with the Amazon Cloud Drive app", May 4, 2012, CNET, 4 pages. (Year: 2012).*

Moranda-Media, "How To Upload a file or video to Google Drive", Mar. 19, 2016), https://www.youtube.com/watch?v=PBSO2dXCx44. YouTube video, No document. (Year: 2016).*

Needleman, "SugarSync: Most useful sync tool ever. But you'll pay for it", May 14, 2008, CNET, 10 pages. (Year: 2008).*

The World Intellectual Property Organization (WIPO) International Search Report for PCT/CN2018/082771 dated Jun. 14, 2018 5 Pages (including translation).

* cited by examiner

FILE TRANSFERRING METHOD AND APPARATUS, INTERACTIVE METHOD AND APPARATUS FOR IMPLEMENTING UPLOADING IN CLOUD STORAGE APPLICATION, MACHINE DEVICE, AND COMPUTER-READABLE STORAGE MEDIUM

RELATED APPLICATIONS

The present disclosure claims priority to PCT Application No. PCT/CN2018/082771, filed on Apr. 12, 2018, which in turn claims priority to Chinese Patent Application No. 2017102840924, entitled "FILE TRANSFERRING METHOD AND APPARATUS AND INTERACTIVE METHOD AND APPARATUS FOR IMPLEMENTING UPLOADING IN CLOUD STORAGE APPLICATION" filed with the Chinese Patent Office on Apr. 26, 2017. The two applications are incorporated by reference in their entirety.

FIELD OF TECHNOLOGY

The present disclosure relates to the field of computer application technologies, and in particular, to a file transferring method and apparatus, an interactive method and apparatus for uploading in a cloud storage application, a machine device, and a computer-readable storage medium thereof.

BACKGROUND OF THE DISCLOSURE

With development of computer application technologies, a plurality of applications may run on a terminal device to implement various functions for a user. In the plurality of applications on the terminal device, a file transferring requirement often exist. Sometimes a function of an application can be implemented only when required file transferring is implemented.

For example, in a cloud storage application, to synchronize a file in a network, uploading of the file to the cloud storage application needs to be implemented first. Often, file transferring is implemented by triggering an uploading button in the cloud storage application. Alternatively, the implementation of the file transferring is triggered by dragging a file icon to a window of the cloud storage application.

When using the file transferring implemented by triggering the uploading button in the cloud storage application, a user needs to memorize a path at which a file is located. Then, the file can be loaded through the specified path after the uploading button is triggered. In such a process, the user has a memorizing burden remember the file location, which may impact the user experience.

When using the file transferring implemented by dragging a file to the window of the cloud storage application, because the window of the cloud storage application occupies the whole screen or a large portion of a screen. If a file on a desktop needs to be uploaded by using the cloud storage application, a user has to drag the window of the cloud storage application to expose an icon of the file that is covered by the window of the cloud storage application, so that the file icon can be dragged into the window of the cloud storage application.

SUMMARY

The present disclosure provides a file transferring method and apparatus, an interactive method and apparatus for implementing uploading files in a cloud storage application, a machine device, and a computer-readable storage medium thereof.

In embodiments of the present disclosure, a file transferring method is applied to a terminal device. The method includes: activating a transferring area on a displayed user interface in response to triggering of file transferring; tracking drag trajectory according to a triggered dragging instruction on the user interface on which the transferring area is activated, and detecting, when the dragging is released, that the transferring area and a file icon overlap; and transferring a corresponding file in response to the file icon overlapping with the transferring area.

In embodiments of the present disclosure, a file transferring control apparatus includes: an area activator, configured to activate a transferring area on a displayed user interface according to triggering of file transferring; a tracker, configured to: track drag trajectory according to a triggered dragging instruction on the user interface on which the transferring area is activated, and detect, when the dragging is released, that the transferring area and a file icon overlap; and a loading trigger, configured to trigger loading of a corresponding file in response to the file icon overlapping with the transferring area.

In embodiments of the present disclosure, a machine device includes a processor and a memory, the memory stores computer-readable instructions, and the computer-readable instructions, when executed by the processor, implements the method described in the present disclosure.

The technical solutions provided in the embodiments of the present disclosure may include the following beneficial effects. When a file needs to be loaded, first, a transferring area is correspondingly activated on a displayed user interface according to triggering of file transferring, so that the transferring area is displayed on the user interface; drag trajectory tracking is performed according to a triggered dragging instruction on the user interface on which the transferring area is activated, and that the transferring area and a file icon overlap is detected when the dragging is released; and loading of the corresponding file is triggered in response to the file icon overlapping with the transferring area. Therefore, under action of the activated transferring area and the file icon, a path does not need to be specified for the file transferring any more, there is no memorizing burden for a user. In addition, the case in which a window occupies an entire screen blocking the file icons does not occur any more, operation performance is improved, and user interaction performance improved.

It should be understood that the above general descriptions and the following detailed descriptions are merely exemplary, and cannot limit the present disclosure.

BRIEF DESCRIPTION OF THE DRAWINGS

The accompanying drawings, which are incorporated herein and constitute a part of this disclosure, illustrate embodiments consistent with the present disclosure, and are used to explain the principles of the present disclosure.

DESCRIPTION OF EMBODIMENTS

Exemplary embodiments are described in detail herein, and examples of the exemplary embodiments are shown in the accompanying drawings. When the following descriptions relate to the accompanying drawings, unless indicated otherwise, same numbers in different accompanying drawings represent same or similar elements. The implementations described in the following exemplary embodiments do not represent all implementations consistent with the present disclosure. On the contrary, the implementations are merely examples of apparatuses and methods that are described in detail in the appended claims and that are consistent with some aspects of the present disclosure.

In an exemplary embodiment, an implementation environment in the present disclosure includes at least a terminal device used by a user. The terminal device may be a desktop computer, a notebook computer, a smartphone, a tablet computer, or the like.

A user may initiate file transferring in the terminal device by using a screen and an input device of the terminal device. The input device is configured to receive a user input. Therefore, the input device may be a mouse configured for the terminal device. The input device may alternatively be a screen having an input function. The input device is not limited herein, provided that control of the user on a displayed element in the screen can be implemented.

Figure 1:
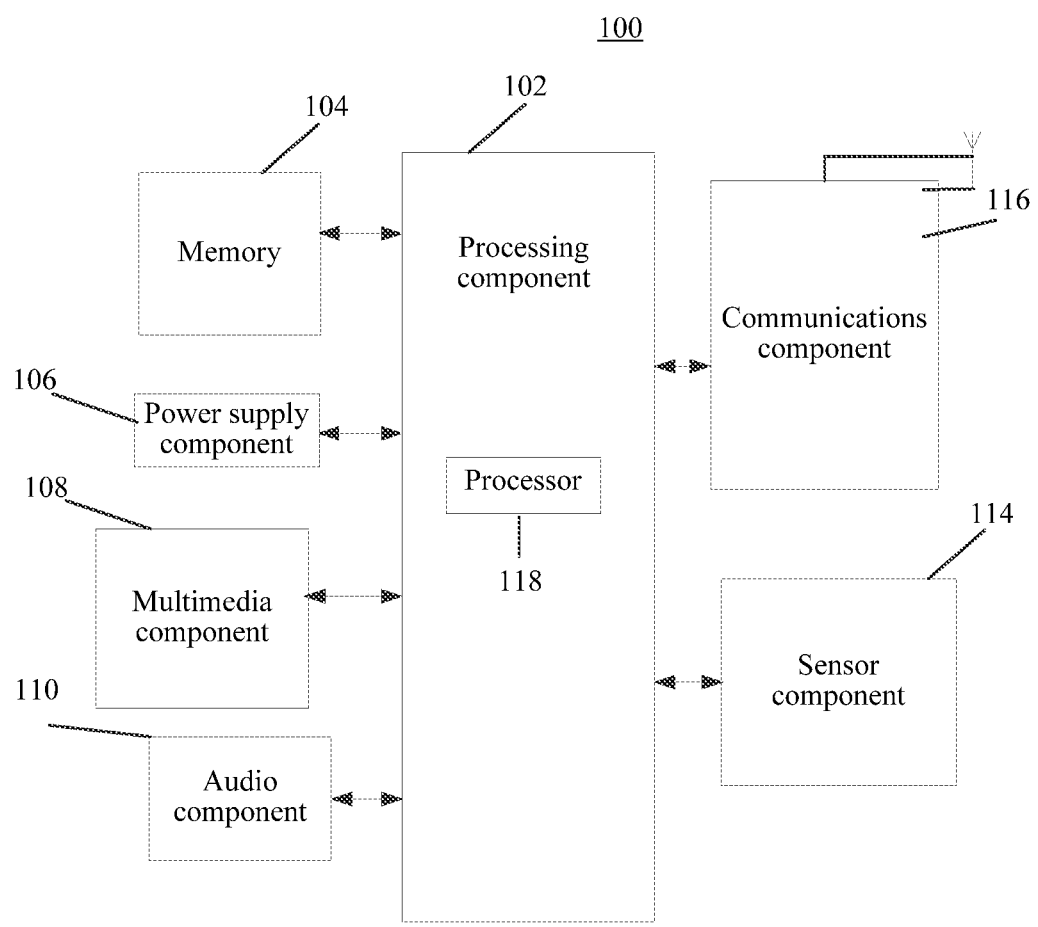
FIG. 1 is a block diagram of an apparatus according to an exemplary embodiment.

FIG. 1 is a block diagram of an apparatus according to an exemplary embodiment. For example, the apparatus 100 may be a terminal device as shown in FIG. 1.

Referring to FIG. 1, the apparatus 100 may include one or more of the following components: a processing component 102, a memory 104, a power supply component 106, a multimedia component 108, an audio component 110, a sensor component 114, and a communications component 116.

The processing component 102 generally controls integral operations of the apparatus 100, such as operations related to displaying, a phone call, data communication, a camera operation, and a record operation. The processing component 102 may include one or more processors 118 to execute instructions, to implement all or some steps of the following method. In addition, the processing component 102 may include one or more devices, to facilitate interaction between the processing component 102 and another component. For example, the processing component 102 may include a multimedia device, to facilitate interaction between the multimedia component 108 and the processing component 102.

The memory 104 is configured to store data of various types to support operations on the apparatus 100. Examples of the data include instructions of any application program or method that are used for operations on the apparatus 100. The memory 104 may be implemented by using a volatile or non-volatile storage device of any type or a combination thereof, for example, a static random access memory (SRAM), an electrically erasable programmable read-only memory (EEPROM), an erasable programmable read only memory (EPROM), a programmable read-only memory (PROM), a read-only memory (ROM), a magnetic memory, a flash memory, a disk, or an optical disc. The memory 104 further stores one or more modules, and the one or more modules are configured to be executed by the one or more the processor 118, to implement all or some steps of the following method shown in any of FIG. 2, FIG. 3, FIG. 4, FIG. 5, FIG. 6, FIG. 7, FIG. 8, FIG. 9, FIG. 10, and FIG. 11.

The power supply component 106 provides power for various components of the apparatus 100. The power supply component 106 may include a power supply management system, one or more power supplies, and another component related to generation, management, and allocation of power for the apparatus 100.

The multimedia component 108 includes a screen that is between the apparatus 100 and a user and that provides an output interface. In some embodiments, the screen may include a liquid crystal display (LCD) and a touch panel. If the screen includes the touch panel, the screen may be implemented as a touchscreen to receive an input signal from the user. The touch panel includes one or more touch sensors to sense a touch, a slide, and a gesture on the touch panel. The touch sensor may not only sense a perimeter of a touch or slide operation, but also detect duration and pressure related to the touch or slide operation. The screen may further include an organic electroluminescent display (OLED).

The audio component 110 is configured to output and/or input an audio signal. For example, the audio component 110 includes a microphone (MIC). When the apparatus 100 is in an operating mode, such as a call mode, a record mode, and a speech recognition mode, the microphone is configured to receive an external audio signal. The received audio signal may further be stored in the memory 104 or be sent by using the communications component 116. In some embodiments, the audio component 110 further includes a speaker, configured to output an audio signal.

The sensor component 114 includes one or more sensors, configured to provide a status assessment in each aspect for the apparatus 100. For example, the sensor component 114 may detect a power-on/off state of the apparatus 100 and a relative location of a component. The sensor component 114 may further detect changes in a location of the apparatus 100 or a component of the apparatus 100 and changes in a temperature of the apparatus 100. In some embodiments, the sensor component 114 may further include a magnetic sensor, a pressure sensor, or a temperature sensor.

The communications component 116 is configured to facilitate communication between the apparatus 100 and another device in a wired or wireless manner. The apparatus 100 may access a communication standard-based wireless network, such as Wireless Fidelity (Wi-Fi). In an exemplary embodiment, the communications component 116 receives, by using a broadcast channel, a broadcast signal or broadcast-related information from an external broadcast management system. In an exemplary embodiment, the communications component 116 further includes a near field communication (NFC) module to facilitate short-distance communication. For example, the NFC module may be implemented based on a radio frequency identification (RFID) technology, an Infrared Data Association (IrDA) technology, an ultra-wideband (UWB) technology, a Bluetooth technology, and another technology.

In an exemplary embodiment, the apparatus 100 may be implemented by using one or more application-specific integrated circuits (ASIC), a digital signal processor, digital signal processing device, a programmable logic device, a field programmable gate array, a controller, a micro controller, a microprocessor, or another electronic element, and is configured to perform the following method.

Figure 2:
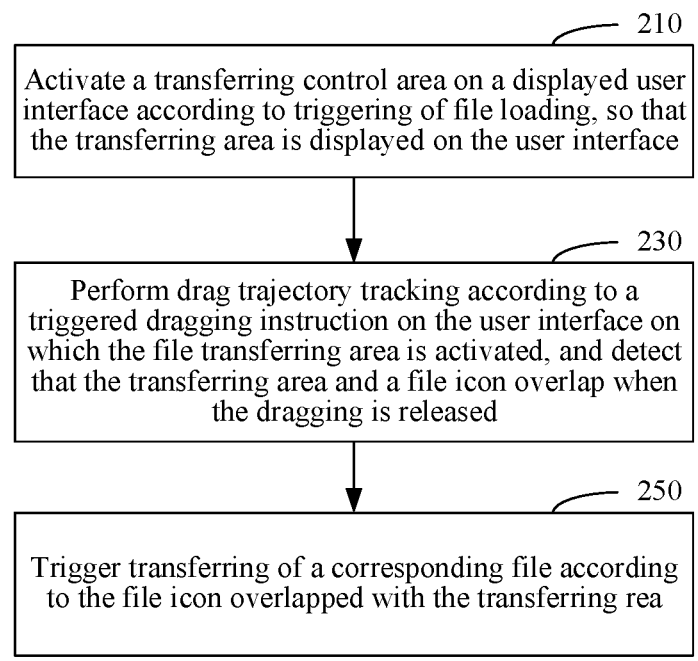
FIG. 2 is a flowchart of a file transferring method according to an exemplary embodiment.

FIG. 2 is a flowchart of a file transferring method according to an exemplary embodiment. The file transferring method is applicable to the terminal device in the foregoing implementation environment. In an exemplary embodiment, the terminal device may be the apparatus shown in FIG. 1. As shown in FIG. 2, the file transferring method may be performed by the terminal device and may include the following steps.

Step 210: Activate a transferring area on a displayed user interface according to triggering of file transferring, so that the transferring area is displayed on the user interface.

A file that needs to be uploaded may be any file stored in the terminal device. A file icon corresponding to the file may be located on a desktop interface, or may be located in a folder window. The location is specifically determined by a path in which the file is stored.

The user interface displayed by the terminal device is a user interface displayed by the terminal device when the file transferring is triggered. In an exemplary embodiment, the displayed user interface is a desktop interface of the terminal device, and the displayed desktop interface may have a folder window because a folder is open.

The transferring area is a control area or element that performs the file transferring on the user interface. After the transferring area is activated, the transferring area may exist on the displayed user interface, so that transferring of a specified file can be performed through the transferring area. In an exemplary embodiment, the transferring area may be a pop-up window or a floating layer of the terminal device, which may be determined according to an interaction form required by operation.

It should be understood that after the transferring area is activated, the transferring area occupies only a small area of the user interface. In a specific implementation of an exemplary embodiment, the transferring area is only slightly greater than an icon.

The triggering of the file transferring in the terminal device is triggering of a file transferring function in the terminal device. Specifically, the triggering of the file transferring may be triggering of a file transferring function in an application. In this case, the terminal device waits for loading of any file. Alternatively, the triggering of the file transferring may be triggering of loading of a specified file in an application. A specific implementation is determined according to a process of triggering the file transferring.

On one hand, the triggering of the file transferring may be implemented by using a function triggering operation on the user interface displayed by the terminal device. For example, a specified operation is triggered for a program icon configured for an application on the user interface. The program icon may be an icon displayed with running of the application, or may be an icon of a file transferring component of the application. On the other hand, the triggering of the file transferring may alternatively be implemented by using an operation of triggering a file icon of a specified file.

When the terminal device listens to that the file transferring is triggered, the transferring area may be activated on the user interface, to obtain the user interface displaying the transferring area.

Step 230: Perform drag trajectory tracking according to a triggered dragging instruction on the user interface on which the transferring area is activated, and detect, when the dragging is released, that the transferring area and a file icon overlap.

The triggered dragging instruction is generated by triggering a dragging operation on the transferring area or the file icon on the user interface, to indicate occurrence of a dragging process under triggering of a file transferring function, so that the drag trajectory tracking can be performed in time, thereby ensuring sensing accuracy about whether the file transferring is performed.

The triggered dragging instruction indicates the occurrence of the dragging process and a dragged object. Therefore, after the dragging instruction is obtained, the drag trajectory tracking is performed on the dragged object on the user interface on which the transferring area is activated. During the drag trajectory tracking, when the dragged object is released, detecting that the transferring area and the file icon overlap is triggered. In other words, the dragged object is the file icon or the transferring area. During dragging, the dragged object is released after the file icon and the transferring area overlap.

It should be further noted that, that the transferring area and the file icon overlap includes a case in which the file icon is dragged into the transferring area and a case in which the transferring area is dragged onto the file icon.

That is, that the transferring area and the file icon overlap is a case in which the transferring area and the file icon cover each other. That the transferring area and the file icon overlap includes partially coverage, that is, partially overlapping between the transferring area and the file icon. That the transferring area and the file icon overlap further includes complete coverage of one area on another area. For example, when the transferring area is greater than the dragged file icon in a covered area range, and the transferring area is dragged onto the file icon, the transferring area completely covers the file icon. This is a case in which the transferring area and the file icon completely overlap. That the transferring area and the file icon overlap further includes a case in which an area falls into another area. For example, when the transferring area is greater than the dragged file icon in a covered area range, and the file icon is dragged into the transferring area, the file icon that is completely dragged into the transferring area falls into the transferring area. This is another case in which the transferring area and the file icon completely overlap.

With mutual dragging between the transferring area and the file icon, the transferring area and the file icon may contact each other and then partially overlap. On such a basis, the transferring area and the file icon completely overlap with continuation of the dragging. The entire process is a process in which the transferring area and the file icon overlap.

In this process, loading of a corresponding file is triggered in the terminal device at any time when the dragging is released.

Step 250: Trigger loading of a corresponding file in response to the file icon overlapping with the transferring area.

First, it should be noted that, on one hand, that the transferring area and the file icon overlap in the terminal device indicates the loaded file, that is, the file corresponding to the file icon; on the other hand, that the transferring area and the file icon overlap in the terminal device also indicates execution of a file transferring process.

On such a basis, the terminal device obtains, in response to the file icon overlapping with the transferring area, the specified file on which the file transferring process is to be performed, so that the file transferring function in an application may be implemented by performing the file transferring process on the file.

According to the foregoing exemplary embodiment, for control of a user, the file transferring can be directly implemented only by activating the transferring area in the terminal device and triggering dragging. The operation is simple and convenience without any repeated control process. Therefore, lightweight file transferring is implemented on a user side.

Herein, it should be additionally noted that, the file transferring implemented in the terminal device may be a process of importing the file into the application, or may be a process of loading the file by the application, or may be a process of uploading the file by the application. This is not limited herein and may be flexibly configured according to the application in which the file is located.

That is, the foregoing exemplary embodiment may be configured for a plurality of applications, for example, a cloud storage application, that is run on the terminal device.

Figure 3:
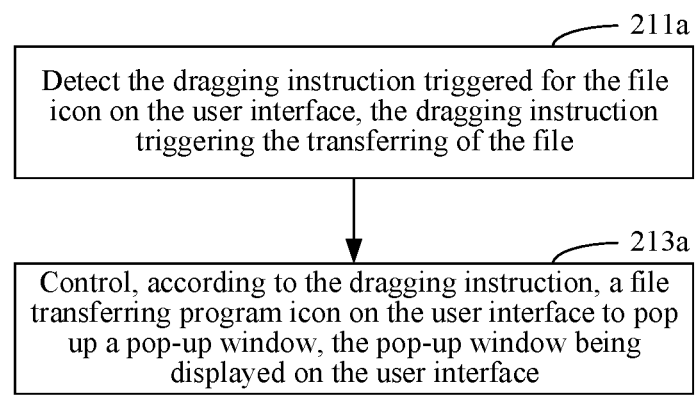
FIG. 3 is a flowchart for describing details of a step of activating a transferring area on a displayed user interface according to triggering of file transferring, so that the transferring area is displayed on the user interface in an exemplary embodiment according to the embodiment corresponding to FIG. 2.

FIG. 3 is a flowchart for describing details of step 210 according to the embodiment corresponding to FIG. 2. The transferring area is a pop-up window. Step 210, as shown in FIG. 3, may include the following steps.

Step 211*a*: Detect the dragging instruction triggered for the file icon on the user interface, the dragging instruction triggering the loading of the file.

The file icon corresponding to the file waiting to be loaded. The file icon exists on the user interface displayed by the terminal device, and the listened-to dragging instruction is generated by triggering the file icon. The dragging instruction indicates the file waiting to be loaded and the triggering of the file transferring.

That is, when the dragging instruction is detected, the file transferring process may be started. The dragging instruction triggered for the file icon is generated through triggering through a dragging operation on the file icon.

For example, when a file needs to be loaded, a dragging operation may be triggered for a corresponding file icon through control of a user. Therefore, the file can be loaded.

Step 213*a*: Control, according to the dragging instruction, a file transferring program icon on the user interface to display a pop-up window, the pop-up window being displayed on the user interface.

The file transferring program icon is located on the user interface of the terminal device. In an exemplary embodiment, the user interface is a desktop interface, and the file transferring program icon is located in a taskbar on the desktop interface. Specifically, the file transferring program icon may be located in a notification area in the taskbar of the terminal device. With running of a file transferring program or running of a specified component in the file transferring program, the user interface of the terminal device displays the file transferring program icon.

After the dragging instruction triggered for the file icon on the user interface is detected in the terminal device, the file transferring program icon displayed by the user interface pops up the pop-up window. The pop-up window popped up by the file transferring program icon occupies only a small area of the user interface and does not cause interference to any control on the user interface, thereby maximally ensuring implementation of subsequent control.

It should be noted that, through the file transferring triggered by triggering the dragging instruction for the file icon. When a file transferring function is triggered, the file waiting to be loaded, that is, the file corresponding to the file icon, is specified. Therefore, the loading process is performed, by using subsequent control, for the file corresponding to the file icon.

Figure 4:
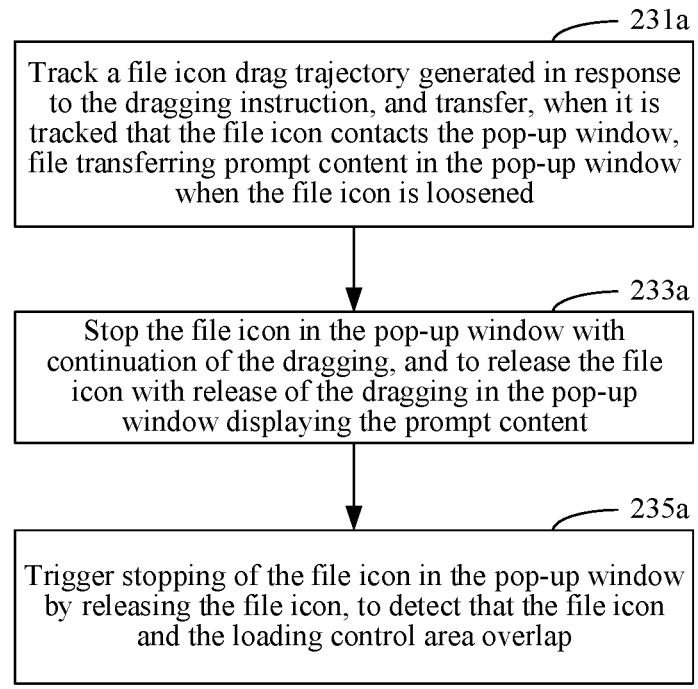
FIG. 4 is a flowchart for describing details of a step of tracking drag trajectory according to a triggered dragging instruction on the user interface on which the transferring area is activated, and detecting, when the dragging is released, that the transferring area and a file icon overlap in an exemplary embodiment according to the embodiment corresponding to FIG. 2.

FIG. 4 is a flowchart for describing details of step 230 according to the embodiment corresponding to FIG. 2. Step 230, as shown in FIG. 4, may include the following steps.

Step 231a: Track a file icon drag trajectory generated in response to the dragging instruction, and load, when the file icon contacts the pop-up window, file transferring prompt content in the pop-up window when the file icon is released.

With the dragging operation triggered for the file icon, on one hand, the dragging instruction is generated; on the other hand, the dragging operation is also kept, to drag the file icon on the user interface, so that the file icon drag trajectory is generated.

Therefore, the file icon drag trajectory is tracked, a relative location between the file icon and the transferring area, a relative location between the file icon and the transferring area are positioned, including a relative location of the file icon when the file icon contacts the pop-up window, a relative location of the file icon in the pop-up window, and the like.

That the file icon contacts the pop-up window is that the file icon is dragged to an edge of the pop-up window. In this case, it indicates that the file icon is going to enter the transferring area.

Herein, it should be noted that, in an interaction process for implementing the file transferring, a user drags the file icon to the transferring area, and releases the file icon until the file icon reaches the transferring area. The release of the file icon in the transferring area directly triggers the file transferring process.

Therefore, when the file icon is dragged to the edge of the pop-up window, the prompt content that triggers the file transferring is loaded in the pop-up window, to guide the user to release the file icon, so that the file transferring is started.

The user is guided by loading the prompt content in the pop-up window. Therefore, convenience of the file transferring in the terminal device is further improved and friendliness of the interaction process is improved.

Step 233a: Keep the file icon in the pop-up window with continuation of the dragging, and to release the file icon with release of the dragging in the pop-up window displaying the prompt content.

As described above, when the file icon is dragged to the edge of the pop-up window, on one hand, the prompt content is loaded in the pop-up window; on the other hand, the file icon continues to be dragged, and the file icon is dragged from the edge of the pop-up window in to the pop-up window. In this case, the dragging is released, that is, the dragging operation of the user is released, and the file icon is also correspondingly released.

It may be understood that in an exemplary embodiment, the released file icon returns to an original location of the file icon on the user interface from the inside of the pop-up window. Therefore, it is ensured that the file transferring is implemented without generating any change or impact, thereby avoiding generation of interference.

Step 235a: Trigger stopping of the file icon in the pop-up window by releasing the file icon, to detect that the file icon and the transferring area overlap.

Before the file icon is released, the file icon is stopped in the pop-up window. The stopping of the file icon in the pop-up window and the subsequent release is detected, so that a listening result indicating that the file icon and the transferring area overlap may be obtained.

In other words, once that the file icon and the transferring area overlap is detected, the loading of the corresponding file is started, for example, the corresponding file is uploaded, or the corresponding file is imported to the application.

According to the foregoing exemplary embodiment, under action of the pop-up window and the file icon, the file transferring is easily and conveniently performed by dragging the file icon without needing to repeatedly viewing the path in which the file is stored or continuously dragging the window to expose the file icon because the file icon is covered, thereby improving operation simplicity.

In an exemplary embodiment, with execution of the file transferring process, the pop-up window prompts a file transferring progress, and another file icon may further be dragged, to load a file again.

Figure 5:
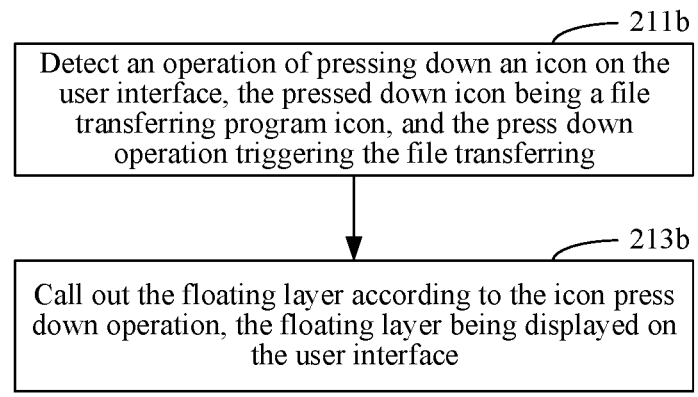
FIG. 5 is a flowchart for describing details of a step of activating a transferring area on a displayed user interface according to triggering of file transferring, so that the transferring area is displayed on the user interface in another exemplary embodiment according to the embodiment corresponding to FIG. 2.

FIG. 5 is a flowchart for describing details of step 210 according to the embodiment corresponding to FIG. 2. In an exemplary embodiment, the transferring area is a floating layer, and step 210, as shown in FIG. 5, may include the following steps.

Step 211b: Detect an operation of pressing down an icon on the user interface, the pressed down icon being a file transferring program icon, and the press down operation triggering the file transferring.

When a file transferring program is run, whether the file transferring is triggered continues to be detected, so that the file transferring triggered by the user can be responded in time.

Specifically, whether the press down operation is triggered for the file transferring program icon on the user interface is detected, and the press down operation triggered for the file transferring program icon is used for triggering the file transferring. However, only the file transferring function is triggered herein without specifying a to-be-loaded file, so that the file that needs to be loaded needs to be specified in a subsequent interaction process.

It should be noted that, the file transferring program icon may be on the user interface. For example, the file transferring program icon may be on a desktop of the terminal device. With running of the file transferring program, the file transferring program icon is displayed on the user interface. In a specific implementation of an exemplary embodiment, the file transferring program icon for which the press down operation is triggered for triggering the file transferring is displayed in the notification area of the taskbar on the user interface with running of the file transferring program, to wait for a user to trigger the file transferring at any time.

In a specific implementation of an exemplary embodiment, the press down operation triggered for the file transferring program icon is a long-press operation triggered for the file transferring program icon, to further avoid occurrence of a mis-operation.

Step 213b: Call out the floating layer according to the icon press down operation, the floating layer being displayed on the user interface.

When the press down operation is triggered for the file transferring program icon, the floating layer is called out for the file transferring. Both the floating layer and the foregoing described pop-up window are temporary interfaces opened on the user interface and are used for implementing specified tasks. For the user interface and current ongoing work of the terminal device, the interruption is relatively little. Therefore, both use of the floating layer and use of the pop-up window have good performance by maintaining continuity of other current ongoing operations.

Specifically, the called out floating layer is a feedback information layer that appears for a period of time and then automatically disappears, and the user is not forced to interact with the floating layer. Therefore, interruption to the user is reduced.

The floating layer is called out for the file transferring program icon by using the press down operation triggered for the file transferring program icon. The floating layer is associated with the file transferring program icon. Therefore, the floating layer may be disposed on the file transferring program icon, or may be disposed on an edge of the file transferring program icon, to facilitate subsequent controlling on the floating layer on premise of keeping the press down operation, thereby ensuring continuity of user control. On one hand, file transferring efficiency is improved; on the other hand, control smoothness is also improved.

According to the foregoing described exemplary embodiment, the controllable floating layer is called out by using the press down operation triggered for the icon, so that loading of any file can be triggered by using the floating layer displayed on the user interface.

Figure 6:
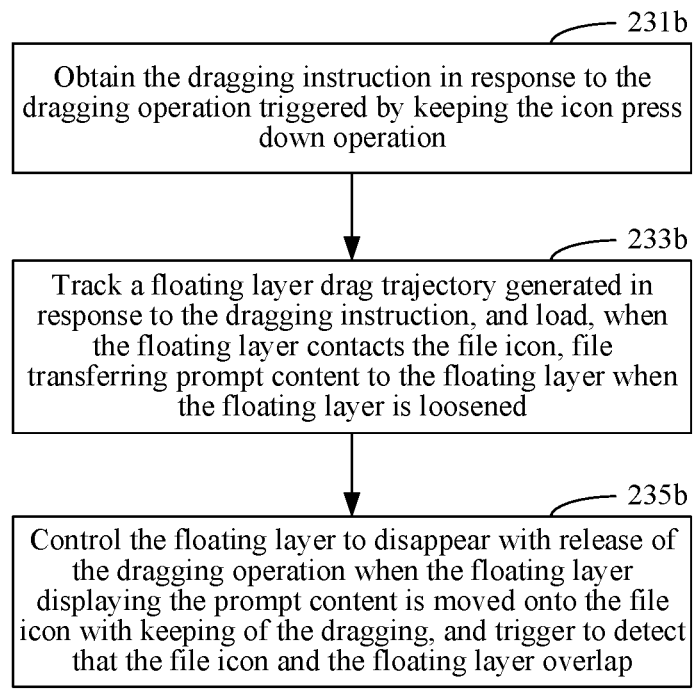
FIG. 6 is a flowchart for describing details of a step of tracking drag trajectory according to a triggered dragging instruction on the user interface on which the transferring area is activated, and detecting, when the dragging is released, that the transferring area and a file icon overlap in another exemplary embodiment according to the embodiment corresponding to FIG. 2.

FIG. 6 is a flowchart for describing details of step 230 according to the embodiment corresponding to FIG. 2. In an exemplary embodiment, a target of the dragging operation is the floating layer, and step 230, as shown in FIG. 6, may include the following steps.

Step 231b: Obtain the dragging instruction in response to the dragging operation triggered by keeping the icon press down operation.

When the user calls out the floating layer by triggering the press down operation for the file transferring program icon, the user keeps the press down operation to trigger dragging. In this case, the dragging instruction is generated. The dragging instruction instructs to detect whether the floating layer and another icon, that is, file icons on the user interface, interact with each other, to obtain a file waiting to be loaded.

Step 233b: Track a floating layer drag trajectory generated in response to the dragging instruction, and load, when the floating layer contacts the file icon, file transferring prompt content to the floating layer when the floating layer is released.

With dragging, the floating layer is dragged to a file icon, so that the floating layer contacts the file icon. The dragging operation is released until the floating layer is moved onto the file icon.

When the floating layer contacts the file icon, it indicates that a file corresponding to the file icon is the file waiting to be loaded and this is not a mis-operation. In this case, the user is guided to load the file, that is, prompt content is loaded into the floating layer, so that the user can control the floating layer according to the prompt content loaded into the floating layer.

Step 235b: Remove the floating layer to disappear with release of the dragging operation when the floating layer displaying the prompt content is moved onto the file icon with keeping of the dragging, and trigger to detect that the file icon and the floating layer overlap.

The floating layer displaying the prompt content continues to be moved onto the file icon with control of the user, and the prompt content starts to be loaded when the floating layer is released. A file transferring process is started, and the floating layer disappears.

In an exemplary embodiment, after the loading process is started and the floating layer disappears, the file transferring program icon pops up a pop-up window, to prompt a loading progress.

According to the foregoing exemplary embodiment, the file transferring is implemented under action of the floating layer and the file icon. During execution of the file transferring process, the file transferring program icon continues to be pressed down, to initiate another file transferring process.

In addition, correspondingly, based on the foregoing exemplary embodiment, an interactive method for implementing uploading in a cloud storage application is further provided. That is, the cloud storage application is implemented according to the foregoing described exemplary embodiment, and the cloud storage application is run on the terminal device in the implementation environment as described above.

Figure 7:
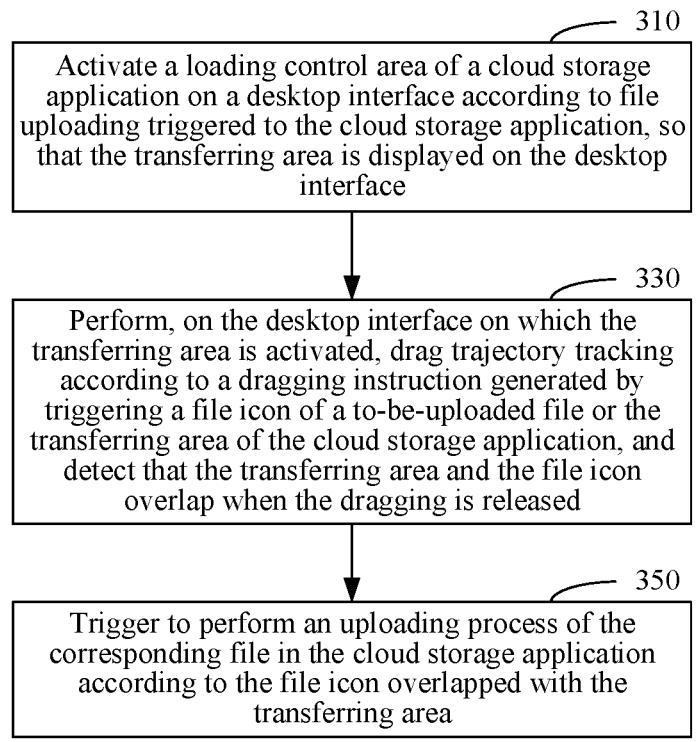
FIG. 7 is a flowchart of an interactive method for implementing uploading in a cloud storage application according to an exemplary embodiment.

FIG. 7 is a flowchart of an interactive method for implementing uploading in a cloud storage application according to an exemplary embodiment. The interactive method for implementing uploading in a cloud storage application, as shown in FIG. 7, may include the following steps.

Step 310: Activate a transferring area of a cloud storage application on a desktop interface according to file uploading triggered to the cloud storage application, so that the transferring area is displayed on the desktop interface.

The cloud storage application is configured to implement network synchronization of a file stored in the terminal device. After running of the cloud storage application is triggered, the file can be uploaded at any time.

Specifically, after the terminal device triggers the running of the cloud storage application, if the terminal device triggers the file uploading of the cloud storage application, the terminal device activates the transferring area of the cloud storage application on the desktop interface. Triggering the file uploading to the cloud storage application is implemented by initiating a file uploading control process of the cloud storage application by a user. In an exemplary embodiment, triggering the file uploading to the cloud storage application may be triggering a cloud storage application icon on the desktop interface or may be triggering a file icon of a file waiting to be loaded. Regardless of which manner is used, triggering the file uploading to the cloud storage application is implemented based on the running of the cloud storage application.

Therefore, the transferring area of the cloud storage application activated by the terminal device may be a pop-up window or a floating layer, and the transferring area matches an interaction scenario in which there is the transferring area.

Step 330: Perform, on the desktop interface on which the transferring area is activated, drag trajectory tracking according to a dragging instruction generated by triggering a file icon of a to-be-uploaded file or the transferring area of the cloud storage application, and detect, when the dragging is released, that the transferring area and the file icon overlap.

After the transferring area of the cloud storage application is activated on the desktop interface, a file uploading control process may be performed in the terminal device.

This control process includes a process of dragging the file icon into the transferring area or dragging the transferring area onto the file icon. For execution of the file uploading process in the cloud storage application, regardless of which control process is executed, the file uploading process may be triggered, provided that the transferring area and the file icon overlap.

Step 350: Trigger to perform an uploading process of the corresponding file in the cloud storage application in response to the file icon overlapping with the transferring area.

According to the foregoing described exemplary embodiment, the file uploading in the cloud storage application may be implemented by using only the transferring area and the file icon, and through simple control of the user.

In one implementation of the cloud storage application, a browser that loads the cloud storage application is an exclusive application in the terminal device. A window of the browser may occupy the whole screen or a large portion of a screen. Therefore, initiation of the file transferring has a limitation of a complex operation path. In addition, there may be other difficulties, such as a fact that a path in which a file is stored cannot be accurately memorized.

However, according to the foregoing described exemplary embodiment, the user can conveniently and rapidly upload a file at any time without opening the browser or the window of the browser, and the user does not need to memorize a path in which the file is stored. Therefore, the uploading can be rapidly implemented.

Figure 8:
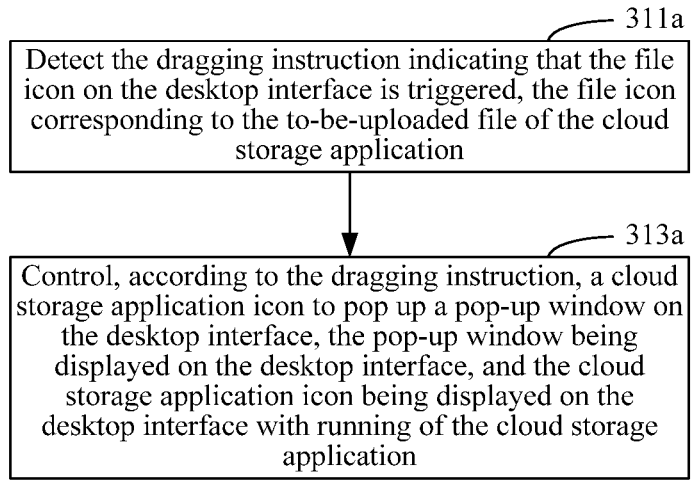
FIG. 8 is a flowchart for describing details of a step of activating a transferring area of a cloud storage application on a desktop interface transferring area in an exemplary embodiment according to the embodiment of FIG. 7.

FIG. 8 is a flowchart for describing details of step 310 according to the embodiment corresponding to FIG. 7. In an exemplary embodiment, the transferring area is a pop-up window, the dragging instruction is generated by triggering the file icon, and step 310, as shown in FIG. 8, may include the following steps.

Step 311a: Detect the dragging instruction indicating that the file icon on the desktop interface is triggered, the file icon corresponding to the to-be-uploaded file of the cloud storage application.

Step 313a: Control, according to the dragging instruction, a cloud storage application icon to display a pop-up window on the desktop interface, the pop-up window being displayed on the desktop interface, and the cloud storage application icon being displayed on the desktop interface with running of the cloud storage application.

On the desktop interface of the terminal device, the cloud storage application icon is displayed on a status bar or a menu bar with running of the cloud storage application. For the file uploading on the desktop interface, the uploading of the corresponding file may be initiated by triggering the dragging instruction for only the file icon.

After the file uploading is initiated, because the transferring area is configured as a pop-up window, the cloud storage application icon pops up the pop-up window, to wait for uploading of any file.

Therefore, the file transferring in the cloud storage application is initiated by dragging the file icon and activating the pop-up window on the cloud storage application icon, so that dragging of the file icon can be continued by using the pop-up window as a target subsequently, to trigger the uploading of the corresponding file.

Figure 9:
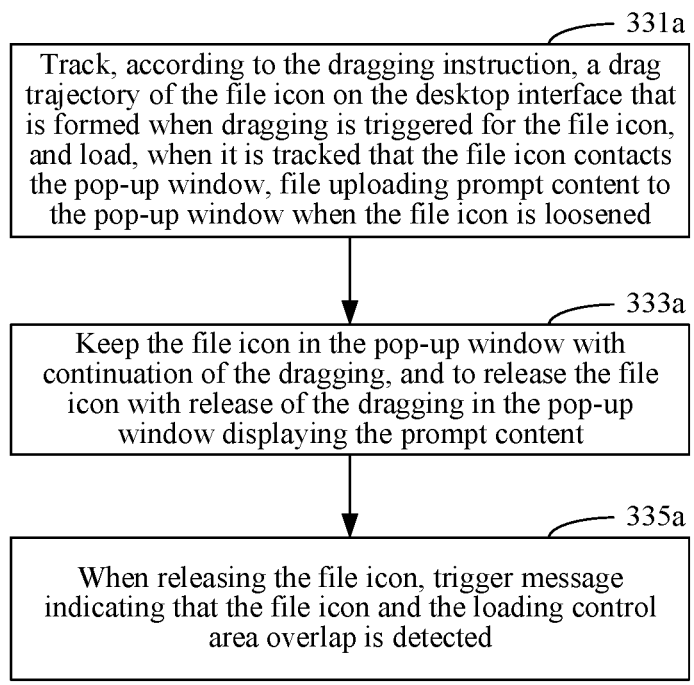
FIG. 9 is a flowchart for describing details of a step of performing, on the desktop interface on which the transferring area is activated, drag trajectory tracking according to a dragging instruction generated by triggering a file icon of a to-be-uploaded file or the transferring area of the cloud storage application, and detecting, when the dragging is released, that the transferring area and the file icon overlap in an exemplary embodiment according to the embodiment of FIG. 7.

Specifically, FIG. 9 is a flowchart for describing details of step 330 according to the embodiment corresponding to FIG. 7. Step 330, as shown in FIG. 9, may include the following steps.

Step 331a: Track, according to the dragging instruction, a drag trajectory of the file icon on the desktop interface that is formed when dragging is triggered for the file icon, and load, when the file icon contacts the pop-up window, file uploading prompt content to the pop-up window when the file icon is released.

Step 333a: Keep the file icon in the pop-up window with continuation of the dragging, and to release the file icon with release of the dragging in the pop-up window displaying the prompt content.

Step 335a: When releasing the file icon, trigger message indicating that the file icon and the loading control area overlap is detected Therefore, a file is uploaded to the cloud storage application. For the user, the process may be implemented by only dragging the file icon. Therefore, the process has very high convenience.

Figure 10:
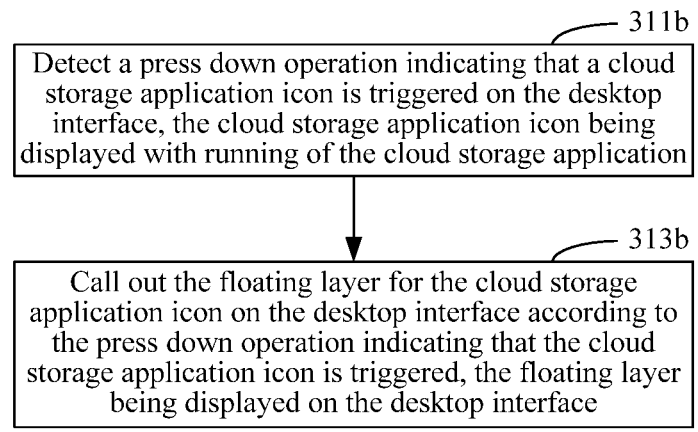
FIG. 10 is a flowchart for describing details of a step of correspondingly activating a transferring area of a cloud storage application on a desktop interface according to file uploading triggered to the cloud storage application, so that the transferring area is displayed on the desktop interface in another exemplary embodiment according to the embodiment of FIG. 7.

FIG. 10 is a flowchart for describing details of step 310 according to the embodiment corresponding to FIG. 7. In an exemplary embodiment, the transferring area is a floating layer, the dragging instruction is generated by triggering the floating layer, and step 310, as shown in FIG. 10, may include the following steps.

Step 311b: Detect a press down operation indicating that a cloud storage application icon is triggered on the desktop interface, the cloud storage application icon being displayed with running of the cloud storage application.

Step 313b: Call out the floating layer for the cloud storage application icon on the desktop interface according to the press down operation indicating that the cloud storage application icon is triggered, the floating layer being displayed on the desktop interface.

During operations of the cloud storage application, a file uploading function is initiated by triggering the cloud storage application icon on the desktop interface. Specifically, the user triggers the press down operation for the cloud storage application icon on the desktop interface, and the cloud storage application icon calls out the floating layer, to wait for specifying a file and triggering performing a file uploading process.

It may be understood that, the dragging instruction is generated by triggering the floating layer. Therefore, a file that needs to be uploaded is specified and a file uploading process is triggered by a dragging operation triggered by the user for the floating layer.

Figure 11:
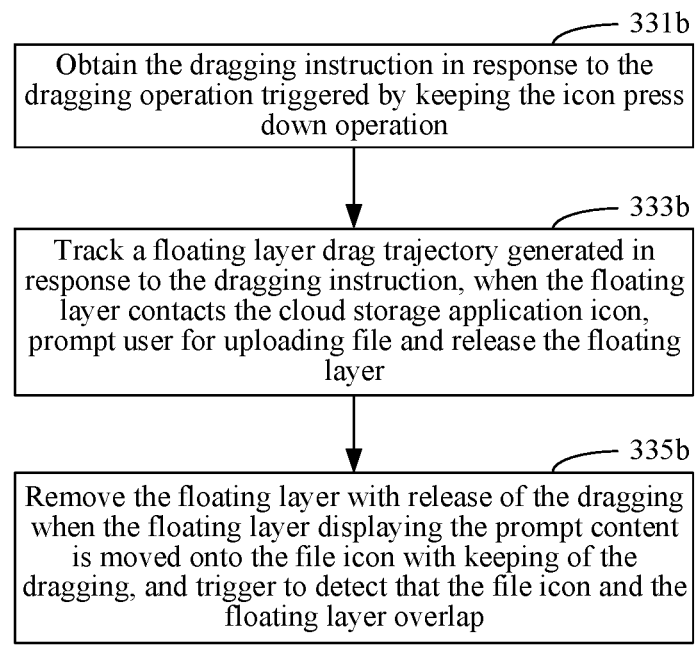
FIG. 11 is a flowchart for describing details of a step of performing, on the desktop interface on which the transferring area is activated, drag trajectory tracking according to a dragging instruction generated by triggering a file icon of a to-be-uploaded file or the transferring area of the cloud storage application, and detecting, when the dragging is released, that the transferring area and the file icon overlap in another exemplary embodiment according to the embodiment of FIG. 7.

FIG. 11 is a flowchart for describing details of step 330 according to the embodiment corresponding to FIG. 7. Step 330, as shown in FIG. 11, may include the following steps.

Step 331b: Obtain the dragging instruction in response to the dragging operation triggered by keeping the icon press down operation.

Step 333b: Track a floating layer drag trajectory generated in response to the dragging instruction, when the floating layer contacts the cloud storage application icon, prompt user for uploading file and release the floating layer released.

Step 335b: Remove the floating layer with release of the dragging when the floating layer displaying the prompt content is moved onto the file icon with keeping of the dragging, and trigger to detect that the file icon and the floating layer overlap.

In this embodiment, the floating layer is dragged, under control of the user, to the file icon of the file that needs to be uploaded, to trigger to perform the file uploading in the cloud storage application.

With release of the floating layer, the floating layer disappears from the desktop interface, and the cloud storage application icon pops up a pop-up window to display a file uploading progress, to ensure friendliness of the cloud storage application.

Implementation of file uploading in the cloud storage application is used as an example, and the foregoing described method is described with reference to a specific application scenario. First, it should be noted that the file uploading in the cloud storage application may be implemented by using the following described two interaction scenarios.

In a first example, the transferring area is a pop-up window. File transferring in the cloud storage application is initiated by dragging a file icon on the desktop interface, and an uploading process of a corresponding file may be performed when the file icon is dragged to the pop-up window.

Figure 12:
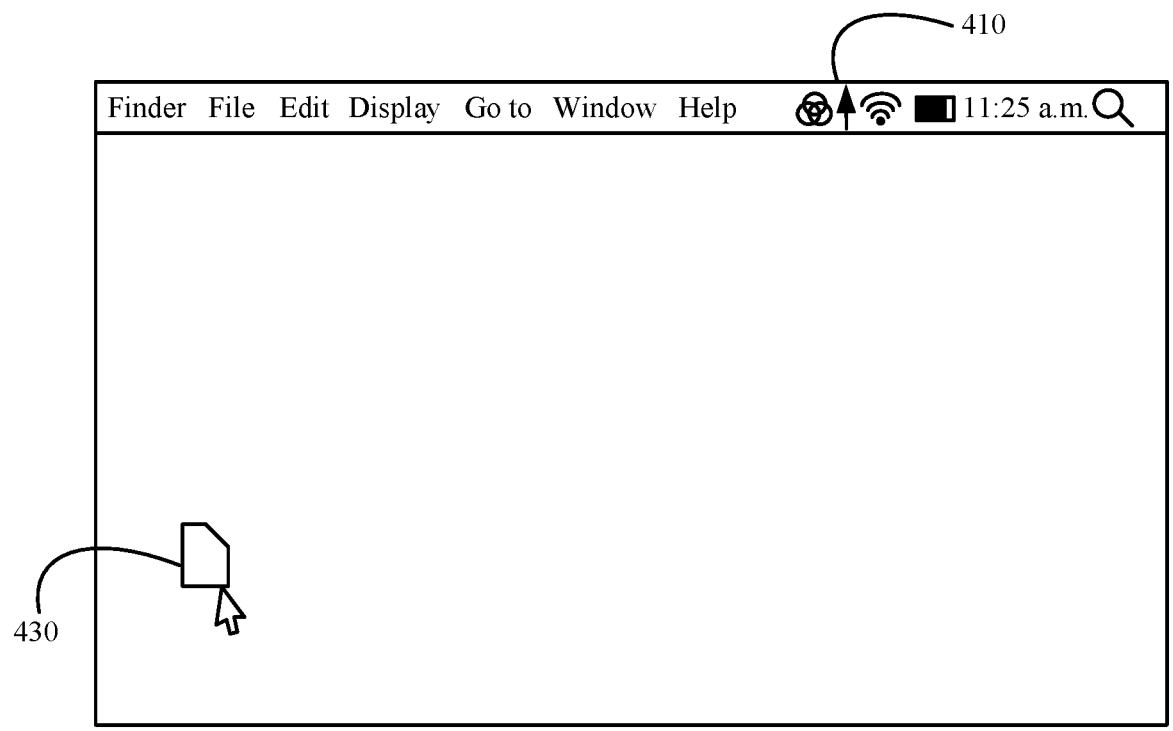
FIG. 12 is a schematic diagram of a desktop interface on which file uploading is not initiated in an interaction scenario.

Specifically, FIG. 12 is a schematic diagram of a desktop interface on which file uploading is not initiated in an interaction scenario. In this desktop interface, because file transferring is not initiated, only a cloud storage application icon 410 is displayed on the desktop interface with running of a cloud storage application.

Figure 13:
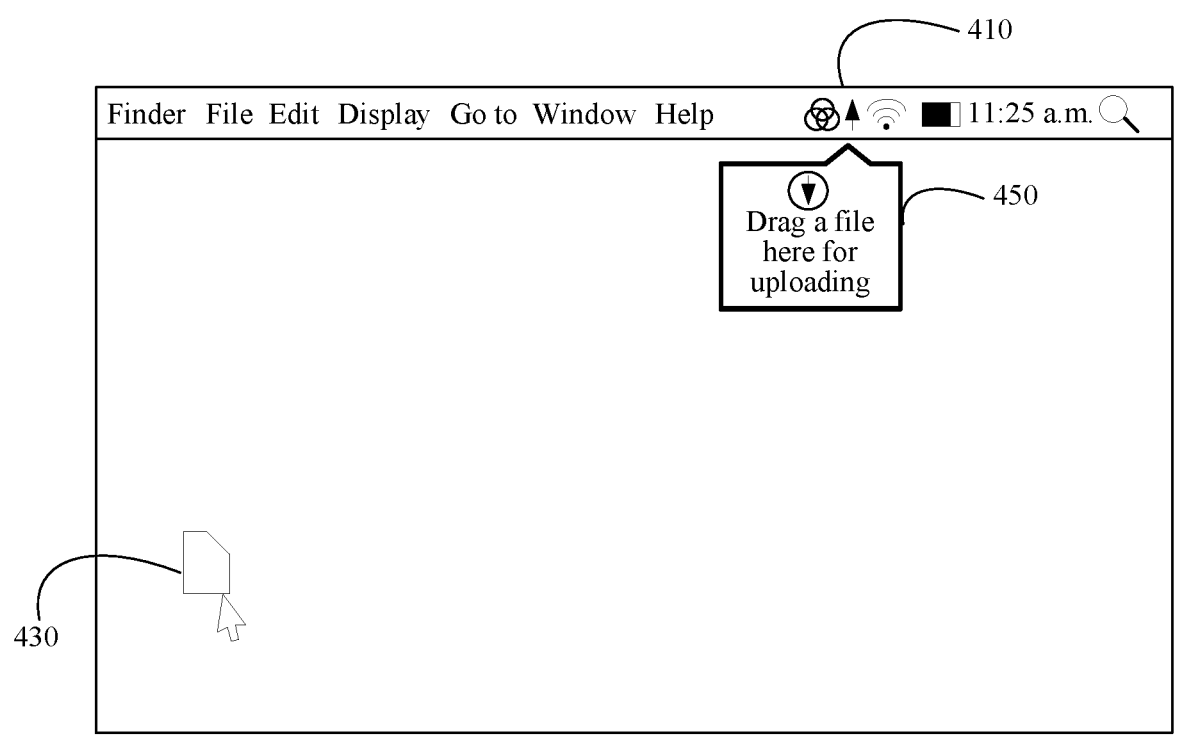
FIG. 13 is a schematic diagram of a desktop interface on which a file uploading function is initiated according to the embodiment of FIG. 12.

A file corresponding to a file icon 430 on the desktop interface needs to be uploaded by using the cloud storage application. FIG. 13 is a schematic diagram of a desktop interface on which a file uploading function is initiated according to the embodiment corresponding to FIG. 12.

On this desktop interface, a dragging operation is triggered to the file icon 430 through control of a user, that is, the file icon 430 is dragged on the desktop interface, and the cloud storage application icon 410 pops up a pop-up window 450.

In this process, an operation of the user is determined. If the user triggers only a click operation or a double-click operation for the file icon 430, the pop-up window is not activated. The pop-up window is triggered only when the user long-presses the file icon 430 and drags the file icon 430 for a distance.

Figure 14:
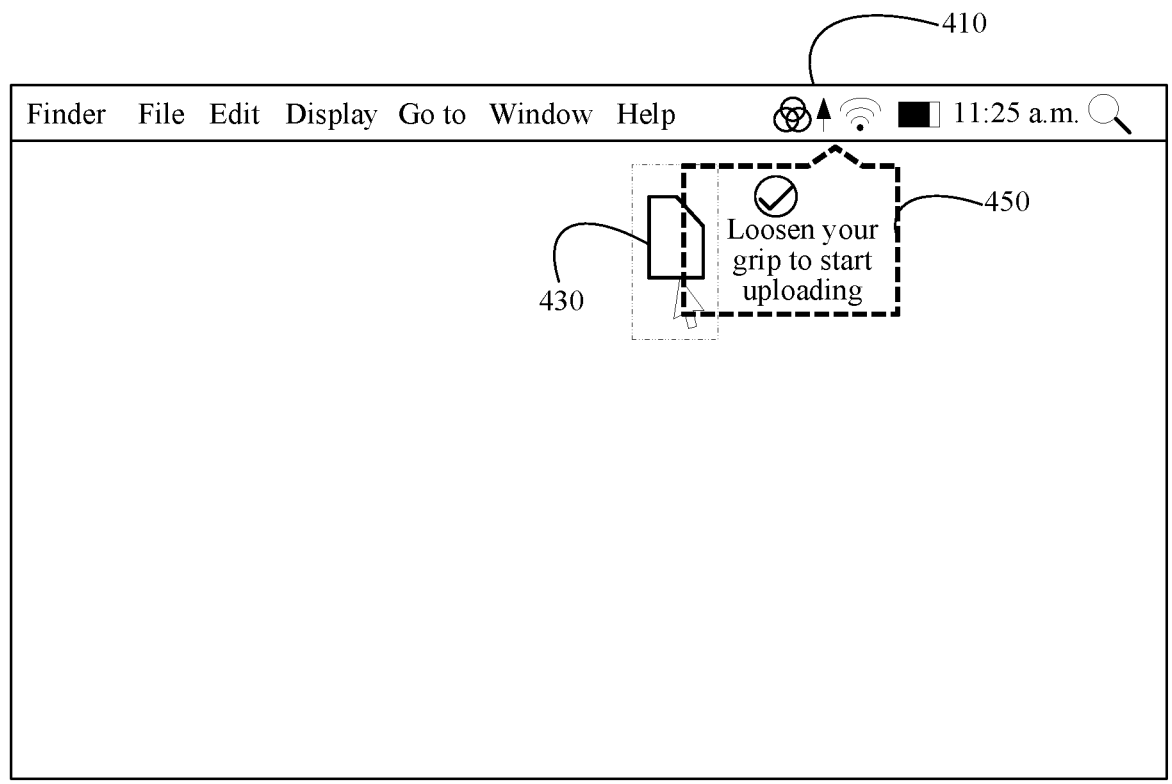
FIG. 14 is a schematic diagram of a desktop interface on which a file icon is dragged to an edge of a pop-up window and then released according to the embodiment of FIG. 13.

FIG. 14 is a schematic diagram of a desktop interface on which a file icon is dragged to an edge of a pop-up window according to the embodiment corresponding to FIG. 13. After the pop-up window is triggered, as shown in FIG. 14, with dragging of the file icon 430 by the user, the file icon 430 contacts the edge of the pop-up window. In this case, the pop-up window loads prompt content, so that the file in the pop-up window is switched to "released to start uploading" to guide the user to use. Then, the user drags the file icon 430 into the pop-up window 450, and when the user releases the file icon 430, the corresponding file starts to be uploaded.

Figure 15:
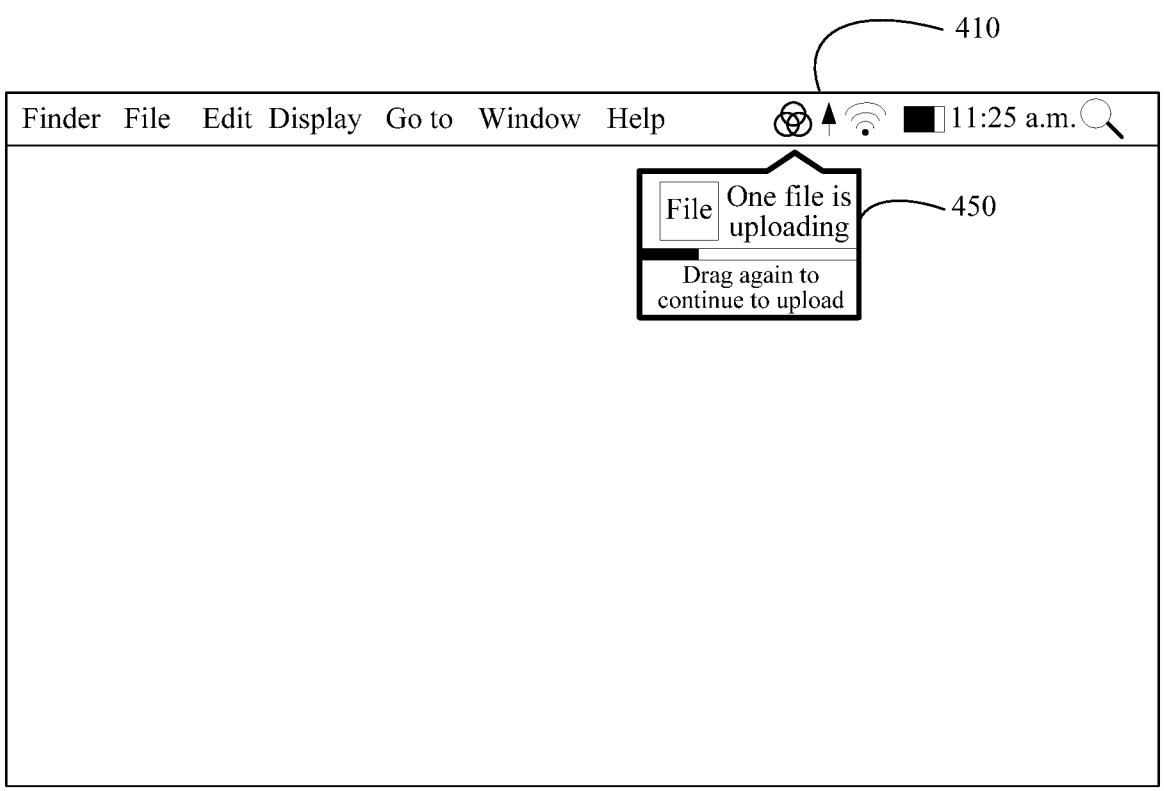
FIG. 15 is a schematic diagram of a desktop interface after a file is uploaded according to the embodiment of FIG. 14.

FIG. 15 is a schematic diagram of a desktop interface after a file is uploaded according to the embodiment corresponding to FIG. 14. After the file starts to be uploaded, the pop-up window 450 prompts a file uploading progress, and allows to continue to drag a file for uploading again.

It the file does not need to be uploaded again, the pop-up window may be retracted by clicking a non-pop-up window area on the desktop interface.

In another example, the transferring area is a floating layer, an uploading function in the cloud storage application is initiated by long-pressing the cloud storage application icon on the desktop interface. The floating layer is called out with initiation of the uploading function, and performs an uploading process for a corresponding file when the floating layer is dragged onto a file icon.

Figure 16:
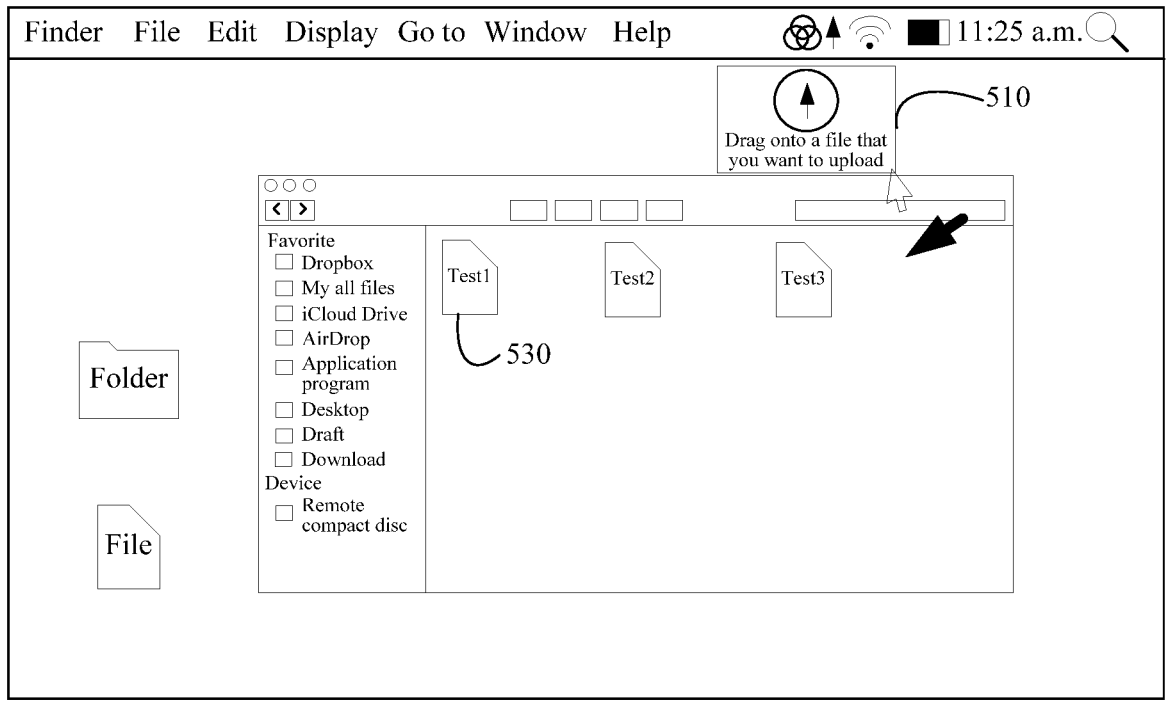
FIG. 16 is a schematic diagram of a desktop interface according to an exemplary embodiment.

Specifically, the floating layer is actually as an uploading component. FIG. 16 is a schematic diagram of a desktop interface on which file uploading is to be initiated according to an exemplary embodiment.

As shown in FIG. 16, a file icon 530 of a file waiting to be uploaded is located in an opened folder window. A user controls a mouse to long-press the cloud storage application icon, to activate a floating layer 510.

Figure 17:
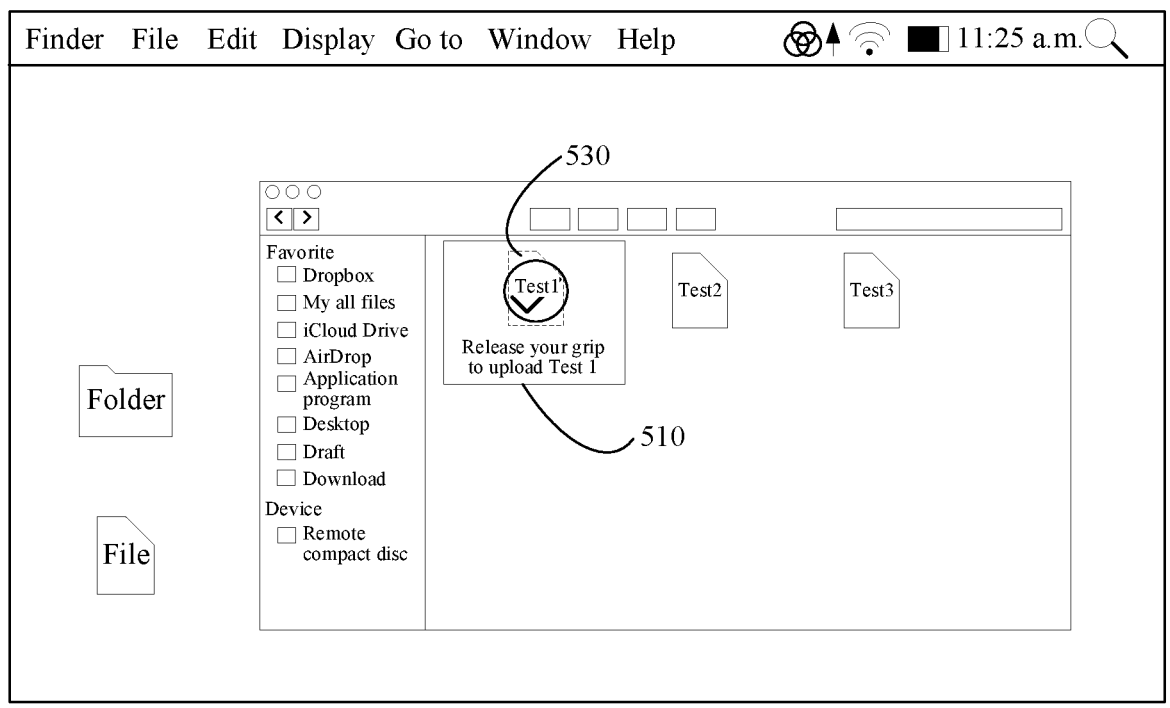
FIG. 17 is a schematic diagram of a desktop interface on which a floating layer is dragged according to the embodiment of FIG. 16.

FIG. 17 is a schematic diagram of a desktop interface on which the floating layer is dragged according to the embodiment corresponding to FIG. 16. As shown in FIG. 17, after the floating layer 510 contacts an edge of the file icon 530, a text in the floating layer is changed into prompt content "released your grip to upload a file", and a file name corresponding to the file icon 530 is identified in the prompt content.

Figure 18:
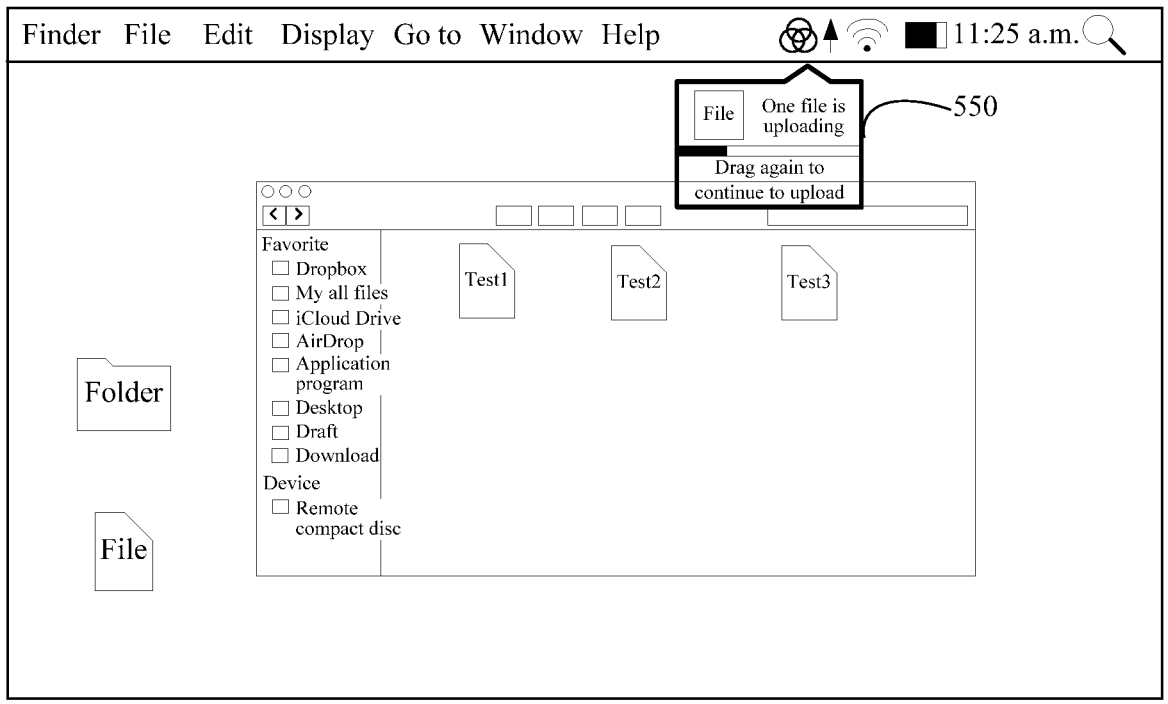
FIG. 18 is a schematic diagram of a desktop interface on which the floating layer is released according to the embodiment of FIG. 17.

FIG. 18 is a schematic diagram of a desktop interface on which the floating layer is released according to the embodiment corresponding to FIG. 17. As shown in FIG. 18, after the floating layer 510 is dragged to the file icon 530, the user releases the floating layer 510, so that the corresponding file can be uploaded. In this case, the floating layer 510 disappears, and the cloud storage application pops up a pop-up window 550, to prompt a file uploading progress.

In this case, the cloud storage application icon may further be long-pressed again to continue to call out the floating layer to perform an uploading operation.

In the foregoing described interaction scenario, the file is uploaded through rapid dragging without assistance of a browser, thereby reducing operation costs of the user.

Apparatus embodiments of the present disclosure are described above, and may be configured to perform the foregoing embodiments of the file transferring method in the present disclosure. For details that are not disclosed in the apparatus embodiments of the present disclosure, refer to the embodiments of the file transferring method in the present disclosure.

Figure 19:
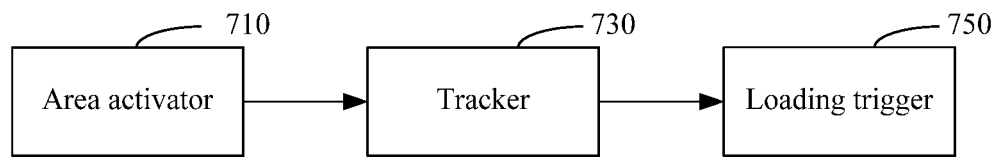
FIG. 19 is a block diagram of a file transferring control apparatus according to an exemplary embodiment.

FIG. 19 is a block diagram of a file transferring control apparatus according to an exemplary embodiment. The file transferring control apparatus, as shown in FIG. 19, may include but is not limited to: an area activator 710, a tracker 730, and a loading trigger 750.

The area activator 710 is configured to activate a transferring area on a displayed user interface according to triggering of file transferring, so that the transferring area is displayed on the user interface.

The tracker 730 is configured to: perform drag trajectory tracking according to a triggered dragging instruction on the user interface on which the transferring area is activated, and detect, when the dragging is released, that the transferring area and a file icon overlap.

The loading trigger 750 is configured to trigger loading of a corresponding file in response to the file icon overlapping with the transferring area.

Figure 20:
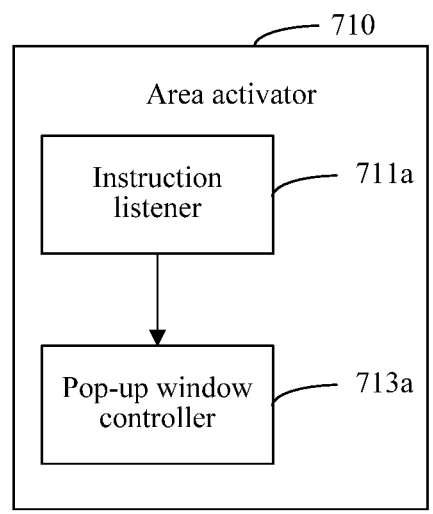
FIG. 20 is a block diagram for describing details of an area activator in an exemplary embodiment according to the embodiment of FIG. 19.

FIG. 20 is a block diagram for describing details of the area activator according to the embodiment corresponding to FIG. 19. The area activator 710, as shown in FIG. 20, may include but is not limited to: an instruction listener 711a and a pop-up window controller 713a.

The instruction listener 711a is configured to detect the dragging instruction triggered for the file icon on the user interface, the dragging instruction triggering the loading of the file.

The pop-up window controller 713a is configured to control, according to the dragging instruction, a file transferring program icon on the user interface to display a pop-up window, the pop-up window being displayed on the user interface.

Figure 21:
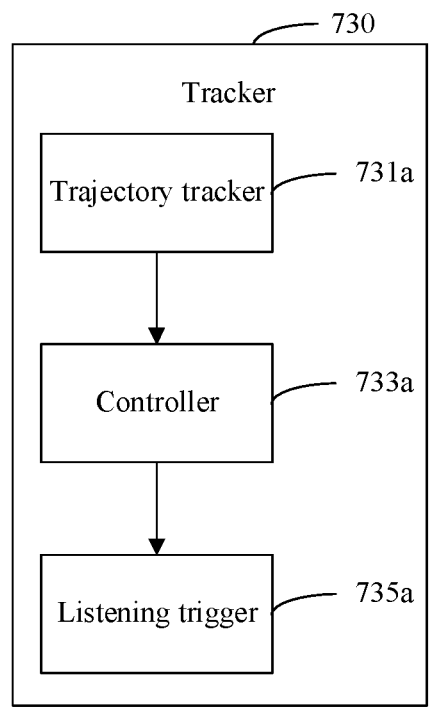
FIG. 21 is a block diagram for describing details of a tracker in an exemplary embodiment according to the embodiment of FIG. 19.

FIG. 21 is a block diagram for describing details of the tracker according to the embodiment corresponding to FIG. 19. The tracker 730, as shown in FIG. 21, may include but is not limited to: a trajectory tracker 731a, a controller 733a, and a listening trigger 735a.

The trajectory tracker 731a is configured to: track a file icon drag trajectory generated in response to the dragging instruction, and load, when the file icon contacts the pop-up window, file transferring prompt content in the pop-up window when the file icon is released.

The controller 733a is configured to: Keep the file icon in the pop-up window with continuation of the dragging, and to release the file icon with release of the dragging in the pop-up window displaying the prompt content.

The listening trigger 735a is configured to trigger stopping of the file icon in the pop-up window by releasing the file icon, to detect that the file icon and the transferring area overlap.

Figure 22:
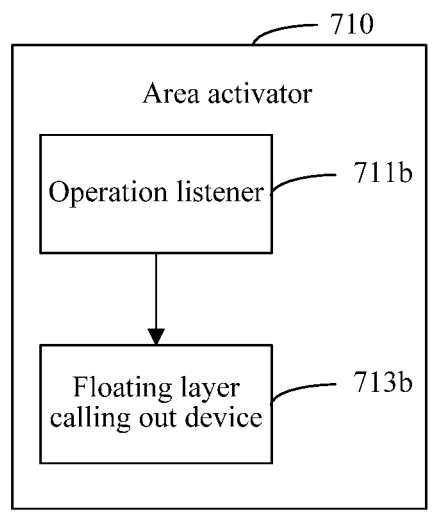
FIG. 22 is a block diagram for describing details of an area activator in another exemplary embodiment according to the embodiment of FIG. 19.

FIG. 22 is a block diagram for describing details of the area activator according to the embodiment corresponding to FIG. 19. The transferring area is a floating layer, and the area activator 710, as shown in FIG. 22, may include but is not limited to: an operation listener 711b and a floating layer calling out device 713b.

The operation listener 711b is configured to detect an operation of pressing down an icon on the user interface, the pressed down icon being a file transferring program icon, and the press down operation triggering the file transferring.

The floating layer calling out device 713b is configured to call out the floating layer according to the icon press down operation, the floating layer being displayed on the user interface.

Figure 23:
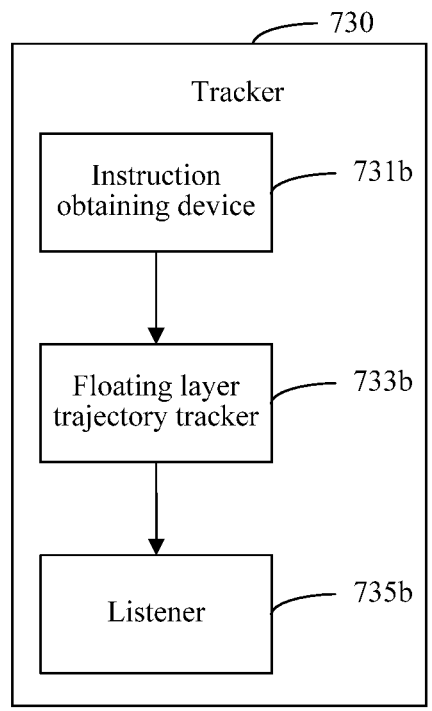
FIG. 23 is a block diagram for describing details of a tracker in another exemplary embodiment according to the embodiment of FIG. 19.

FIG. 23 is a block diagram for describing details of the tracker according to the embodiment corresponding to FIG. 19. A target of the dragging operation is the floating layer, and the tracker 730, as shown in FIG. 23, may include but is not limited to: an instruction obtaining device 731b, a floating layer trajectory tracker 733b, and a listener 735b.

The instruction obtaining device 731b is configured to obtain the dragging instruction in response to the dragging operation triggered by keeping the icon press down operation.

The floating layer trajectory tracker 733b is configured to: track a floating layer drag trajectory generated in response to the dragging instruction, and load, when the floating layer contacts the file icon, file transferring prompt content to the floating layer when the floating layer is released.

The listener 735b is configured to: remove the floating layer with release of the dragging operation when the floating layer displaying the prompt content is moved onto the file icon with keeping of the dragging, and trigger to detect that the file icon and the floating layer overlap.

Figure 24:
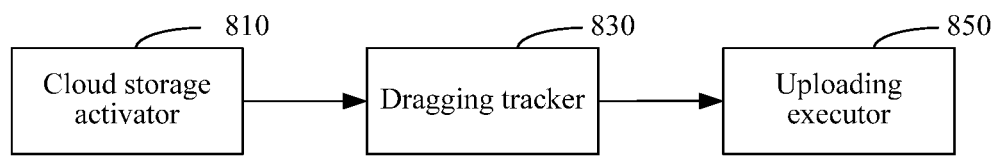
FIG. 24 is a block diagram of an interaction apparatus for implementing uploading in a cloud storage application according to an exemplary embodiment.

FIG. 24 is a block diagram of an interaction apparatus for implementing uploading in a cloud storage application according to an exemplary embodiment. The interaction apparatus for implementing uploading in a cloud storage application, as shown in FIG. 24, may include but is not limited to: a cloud storage activator 810, a dragging tracker 830, and an uploading executor 850.

The cloud storage activator 810 is configured to activate a transferring area of a cloud storage application on a desktop interface according to file uploading triggered to the cloud storage application, so that the transferring area is displayed on the desktop interface.

The dragging tracker 830 is configured to: perform, on the desktop interface on which the transferring area is activated, drag trajectory tracking according to a dragging instruction generated by triggering a file icon of a to-be-uploaded file or the transferring area of the cloud storage application, and detect, when the dragging is released, that the transferring area and the file icon overlap.

The uploading executor 850 is configured to trigger to perform an uploading process of the corresponding file in the cloud storage application in response to the file icon overlapping with the transferring area.

Figure 25:
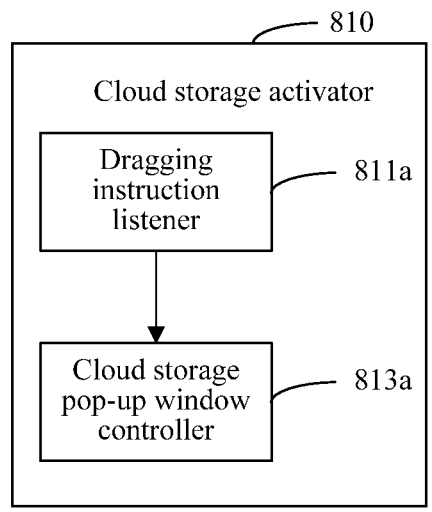
FIG. 25 is a block diagram for describing details of a cloud storage activator in an exemplary embodiment according to the embodiment of FIG. 24.

FIG. 25 is a block diagram for describing details of the cloud storage activator according to the embodiment corresponding to FIG. 24. The transferring area is a pop-up window, and the cloud storage activator 810, as shown in FIG. 25, may include but is not limited to: a dragging instruction listener 811a and a cloud storage pop-up window controller 813a.

The dragging instruction listener 811a is configured to detect the dragging instruction indicating that the file icon on the desktop interface is triggered, the file icon corresponding to the to-be-uploaded file of the cloud storage application.

The cloud storage pop-up window controller 813a is configured to control, according to the dragging instruction, a cloud storage application icon to display a pop-up window on the desktop interface, the pop-up window being displayed on the desktop interface, and the cloud storage application icon being displayed on the desktop interface with running of the cloud storage application.

Figure 26:
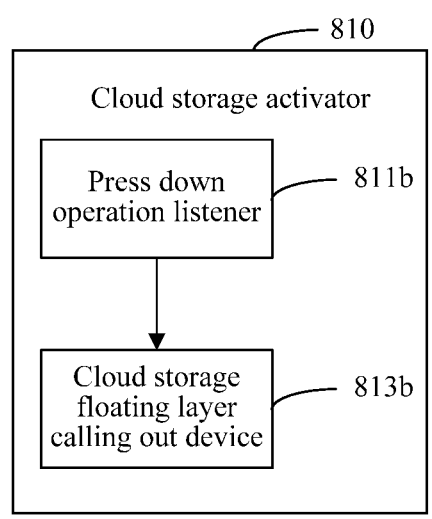
FIG. 26 is a block diagram for describing details of a cloud storage activator in another exemplary embodiment according to the embodiment of FIG. 24.

FIG. 26 is a block diagram for describing details of the cloud storage activator according to the embodiment corresponding to FIG. 24. The transferring area is a floating layer, the dragging instruction is generated by triggering the floating layer, and the cloud storage activator 810, as shown in FIG. 26, may include but is not limited to: a press down operation listener 811b and a cloud storage floating layer calling out device 813b.

The press down operation listener 811b is configured to detect a press down operation indicating that a cloud storage application icon is triggered on the desktop interface, and the cloud storage application icon is displayed with running of the cloud storage application.

The cloud storage floating layer calling out device 813b is configured to call out the floating layer for the cloud storage application icon on the desktop interface according to the press down operation indicating that the cloud storage application icon is triggered, and the floating layer is displayed on the desktop interface.

Optionally, the present disclosure further provides a terminal for performing all or some steps of the file transferring method shown in any one of FIG. 2, FIG. 3, FIG. 4, FIG. 5, and FIG. 6. The terminal includes: a processor; and a memory configured to store processor executable instructions. The processor is configured to: activate a transferring area on a displayed user interface according to triggering of file transferring, so that the transferring area is displayed on the user interface; track drag trajectory according to a triggered dragging instruction on the user interface on which the transferring area is activated, and detect, when the dragging is released, that the transferring area and a file icon overlap; and trigger loading of a corresponding file in response to the file icon overlapping with the transferring area.

Optionally, the present disclosure further provides a terminal for performing all or some steps of the interactive method for implementing uploading in a cloud storage application shown in any one of FIG. 7, FIG. 8, FIG. 9, FIG. 10, and FIG. 11. The terminal includes: a processor; a memory configured to store processor executable instructions. The processor is configured to: activate a transferring area of a cloud storage application on a desktop interface according to file uploading triggered to the cloud storage application, so that the transferring area is displayed on the desktop interface; perform, on the desktop interface on which the transferring area is activated, drag trajectory tracking according to a dragging instruction generated by triggering a file icon of a to-be-uploaded file or the transferring area of the cloud storage application, and detect, when the dragging is released, that the transferring area and the file icon overlap; and trigger to perform an uploading process of the corresponding file in the cloud storage application in response to the file icon overlapping with the transferring area.

In an exemplary embodiment, a storage medium is further provided. The storage medium is a computer-readable storage medium. For example, the storage medium may be a transitory or non-transitory computer-readable storage medium including instructions. The storage medium is, for example, the memory 104 including the instructions. The foregoing instructions may be executed by the processor 118 of the apparatus 100 to implement the file transferring method and the interactive method for implementing uploading in a cloud storage application.

It should be understood that the present disclosure is not limited to the precise structures described above and shown in the accompanying drawings, and various modifications and changes can be made without departing from the scope of the present disclosure. The scope of the present disclosure is limited only by the appended claims.

What is claimed is:

1. A file transferring method applied to a terminal device, the method comprising:
    running, by the terminal device, a cloud storage application configured to implement network synchronization of a file stored in the terminal device;
    displaying, by the terminal device, a file transfer program icon on a taskbar of a user interface of the terminal device, wherein the file transfer program icon is displayed to show running of the cloud storage application on the terminal device;
    triggering, by the terminal device, a display of a transferring area on the user interface via the file transfer program icon upon detecting a triggering of file transferring, the transferring area including a pop up window or a floating layer, wherein the display of the transferring area is triggered by:
        detecting, by the terminal device, a movement of a file icon on the user interface, the file icon representing the file to be loaded, and after detecting the movement of the file icon on the user interface, displaying the pop up window; or
        detecting, by the terminal device, a press-down of the file transferring program icon positioned on the taskbar of the user interface, and after detecting the press-down of the file transferring program icon, displaying the floating layer;
    tracking, by the terminal device, movement of the file icon relative to the transferring area;
    displaying, by the terminal device, a first prompt content in the pop up window prior to the file icon's contacting the pop up window;
    detecting, by the terminal device, that the transferring area contacts the file icon;
    displaying, by the terminal device, a second prompt content in the pop up window after the file icon's contacting the pop up window, wherein the second prompt content differs than the first prompt content;
    triggering, by the terminal device, loading of the file upon detecting the transferring area contacts the file icon;
    causing, by the terminal device, the transferring area to automatically disappear after loading of the file; and
    wherein the transferring area includes the floating layer, the method further comprising: detecting, by the terminal device, movement of the floating layer away from the file transfer program icon and towards the file icon; detecting, by the terminal device, the floating layer contacts the file icon; and causing, by the terminal device, loading of the file represented by the file icon after detecting the floating layer contacts the file icon.

2. The method according to claim 1, further comprising:
    after display of the pop up window, detecting, by the terminal device, movement of the file icon towards the pop up window and towards the file transfer program icon.

3. The method according to claim 1, further comprising:
    after loading of the file, displaying, by the terminal device, in the pop up window a third prompt content different than the second prompt content.

4. The method according to claim 1, further comprising:
    displaying, by the terminal device, a first prompt content in the floating window prior to the floating window's contacting the file icon; and
    displaying, by the terminal device, a second prompt content in the floating window after the floating window's contacting the file icon, wherein the second prompt content differs than the first prompt content.

5. The method according to claim 1, wherein triggering the display of the transferring area further comprises:
    detecting, by the terminal device, a long press of the file icon;
    in response to detecting the long press of the file icon, displaying, by the terminal device, the pop up window.

6. The method according to claim 1, wherein triggering the display of the transferring area further comprises:
    detecting, by the terminal device, a clicking or a double-clicking operation on the file icon;
    in response to detecting the click or the double-click operation, avoiding, by the terminal device, display of the pop up window;
    detecting, by the terminal device, a long-press of the file icon; and
    in response to detecting the long-press of the file icon, displaying, by the terminal device, the pop up window.

7. The method according to claim 1, wherein the second prompt content in the pop up window indicates a file uploading progress.

8. The method according to claim 1, further comprising:
    after the loading of the file is triggered upon detecting the transferring area contacts the file icon, detecting a release of a dragging of the file icon; and
    causing the file icon to return to an original location of the file icon on the user interface.

9. A file transferring apparatus, comprising: a memory; and a processor coupled to the memory, the processor being configured to:
   run a cloud storage application configured to implement network synchronization of a file stored in a terminal device;
   display a file transfer program icon on a taskbar of a user interface, wherein the file transfer program icon is displayed to show running of the cloud storage application on the terminal device;
   trigger a display of a transferring area on the user interface via the file transfer program icon upon detecting a triggering of the file transferring, the transferring area including a pop up window or a floating layer, wherein the display of the transferring area is triggered by:
      detecting a movement of a file icon on the user interface, the file icon representing the file to be loaded, and after detecting the movement of the file icon on the user interface, display the pop up window; or
      detecting, by the terminal device, a press-down of the file transferring program icon positioned on the taskbar of the user interface, and after detecting the press-down of the file transferring program icon, displaying the floating layer;
   track movement of the file icon relative to the transferring area;
   display a first prompt content in the pop up window prior to the file icon's contacting the pop up window;
   detect the transferring area contacts the file icon;
   display a second prompt content in the pop up window after the file icon's contacting the pop up window, wherein the second prompt content differs than the first prompt content;
   trigger loading of the file upon detecting the transferring area contacts the file icon;
   cause the transferring area to automatically disappear after loading of the file; and
   wherein the transferring area includes the floating layer, the processor is further configured to: detect movement of the floating layer away from the file transfer program icon and towards the file icon; detect the floating layer contacts the file icon; and cause loading of the file represented by the file icon after detecting the floating layer contacts the file icon.

10. The apparatus according to claim 9, wherein the processor is further configured to:
   after display of the pop up window, detect movement of the file icon towards the pop up window.

11. The apparatus according to claim 9, wherein the processor is further configured to:
   after loading of the file, display in the pop up window a third prompt content different than the second prompt content.

12. The apparatus according to claim 9, wherein the processor is further configured to:
   display a first prompt content in the floating window prior to the floating window's touching of the file icon; and
   display a second prompt content in the floating window after the floating window's touching of the file icon, wherein the second prompt content differs than the first prompt content.

13. A non-transitory computer-readable storage medium storing computer program instructions executable by at least one processor to perform:
   running a cloud storage application configured to implement network synchronization of a file stored in a terminal device;
   displaying a file transfer program icon on a taskbar of a user interface, wherein the file transfer program icon is displayed to show running of the cloud storage application on the terminal device;
   triggering a display of a transferring area on the user interface via the file transfer program icon upon detecting a triggering of file transferring, the transferring area including a pop up window or a floating layer, wherein the display of the transferring area is triggered by:
      detecting a movement of a file icon on the user interface, the file icon representing the file to be loaded, and after detecting the movement of the file icon on the user interface, displaying the pop up window; or
      detecting, by the terminal device, a press-down of the file transferring program icon positioned on the taskbar of the user interface, and after detecting the press-down of the file transferring program icon, displaying the floating layer;
   tracking movement of the file icon relative to the transferring area is activated;
   displaying a first prompt content in the pop up window prior to the file icon's contacting the pop up window;
   detecting the transferring area contacts the file icon;
   displaying a second prompt content in the pop up window after the file icon's contacting the pop up window, wherein the second prompt content differs than the first prompt content;
   triggering loading of the file upon detecting the transferring area contacts the file icon;
   causing the transferring area to automatically disappear after loading the file; and
   wherein the transferring area includes the floating layer, and the computer program instructions are executable by the at least one processor to further perform: detecting movement of the floating layer away from the file transfer program icon and towards the file icon; detecting the floating layer contacts the file icon; and causing loading of the file represented by the file icon after detecting the floating layer contacts the file icon.

14. The non-transitory computer-readable storage medium according to claim 13, wherein the computer program instructions are further executable by the at least one processor to perform:
   after display of the pop up window, detecting movement of the file icon towards the pop up window and towards the file transfer program icon.

15. The non-transitory computer-readable storage medium according to claim 13, wherein the computer program instructions are further executable by the at least one processor to perform:
   after loading of the file, displaying in the pop up window a third prompt content different than the second prompt content.

16. The non-transitory computer-readable storage medium according to claim 13, wherein the computer program instructions are further executable by the at least one processor to perform:
   displaying a first prompt content in the floating window prior to the floating window's contacting the file icon; and
   displaying a second prompt content in the floating window after the floating window's contacting the file icon, wherein the second prompt content differs than the first prompt content.

* * * * *